United States Patent
Vial et al.

(10) Patent No.: US 11,828,192 B2
(45) Date of Patent: Nov. 28, 2023

(54) HOLLOW BLADE CONTAINING AN INTERNAL LATTICE

(71) Applicant: SAFRAN HELICOPTER ENGINES, Bordes (FR)

(72) Inventors: Laurence Vial, Moissy-Cramayel (FR); Sylvain Pierre Votie, Moissy-Cramayel (FR); Denis Daniel Jean Boisseleau, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 17/423,710

(22) PCT Filed: Jan. 17, 2020

(86) PCT No.: PCT/FR2020/050066
§ 371 (c)(1),
(2) Date: Jul. 16, 2021

(87) PCT Pub. No.: WO2020/148512
PCT Pub. Date: Jul. 23, 2020

(65) Prior Publication Data
US 2022/0112812 A1 Apr. 14, 2022

(30) Foreign Application Priority Data
Jan. 18, 2019 (FR) .................... 19 00448

(51) Int. Cl.
*F01D 5/18* (2006.01)
*F01D 5/14* (2006.01)
*B22F 5/04* (2006.01)
*B33Y 10/00* (2015.01)

(52) U.S. Cl.
CPC ............ *F01D 5/18* (2013.01); *F05D 2230/31* (2013.01)

(58) Field of Classification Search
CPC . F01D 5/147; F01D 5/282; F01D 5/16; F01D 5/18; F01D 25/06; F01D 9/02;
(Continued)

(56) References Cited

U.S. PATENT DOCUMENTS 7,101,154 B2  9/2006  Dambrine et al.
9,470,095 B2 * 10/2016  Propheter-Hinckley ..................... F01D 5/16

(Continued)

FOREIGN PATENT DOCUMENTS

DE  10 2017 208 631 A1  11/2018
EP  2 843 192 A1  3/2015
(Continued)

OTHER PUBLICATIONS

International Search Report dated Sep. 2, 2020 in PCT/FR2020/050066 (with English translation), 5 pages.
(Continued)

*Primary Examiner* — Eric J Zamora Alvarez
(74) *Attorney, Agent, or Firm* — Oblon, McClelland, Maier & Neustadt, L.L.P.

(57) ABSTRACT

A lattice formed of entwined links in a cavity encased by the external skin of a blade and provided with parts of low mechanical strength referred to as breakable, which are capable of rupturing when sufficient loads are applied thereto during operation of the blade. This arrangement, which concentrates the ruptures at given locations, will leave the rest of the lattice intact and therefore will not hamper or will scarcely hamper its properties of heat evacuation by conduction or convection or pressure loss, if for example ventilation air passes through it.

14 Claims, 3 Drawing Sheets

Figure 4:
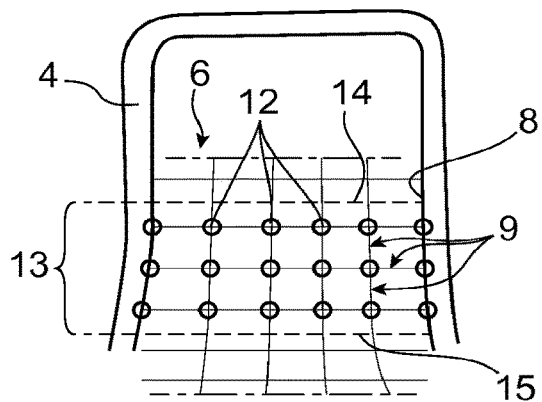

(58) Field of Classification Search
CPC ........ F01D 25/005; F01D 5/186; F01D 5/187; F01D 5/3007; F01D 25/04; F04D 29/023; F04D 29/324; F05D 2300/603; F05D 2300/6012; F05D 2230/31; F05D 2300/614; F05D 2240/30; F05D 2260/96; B33Y 80/00; B33Y 10/00; B22F 5/04
See application file for complete search history.

(56) References Cited

U.S. PATENT DOCUMENTS

| | | | |
|---|---|---|---|
| 9,816,381 B2 * | 11/2017 | Cortequisse | .......... B29C 64/153 |
| 2005/0084377 A1 | 4/2005 | Dambrine et al. | |
| 2006/0257260 A1 | 11/2006 | Dambrine et al. | |
| 2016/0115822 A1 * | 4/2016 | Cortequisse | ............ B22F 7/006 |
| | | | 415/200 |
| 2016/0136925 A1 | 5/2016 | Chamberlain et al. | |
| 2020/0080611 A1 | 3/2020 | Blank et al. | |

FOREIGN PATENT DOCUMENTS

| | | |
|---|---|---|
| EP | 3 015 647 A1 | 5/2016 |
| WO | WO 2014/151066 A1 | 9/2014 |

OTHER PUBLICATIONS

French Preliminary Search Report dated Sep. 23, 2019 in Patent Application No. FR 1900448 (with English translation of categories of cited documents), 7 pages.

* cited by examiner

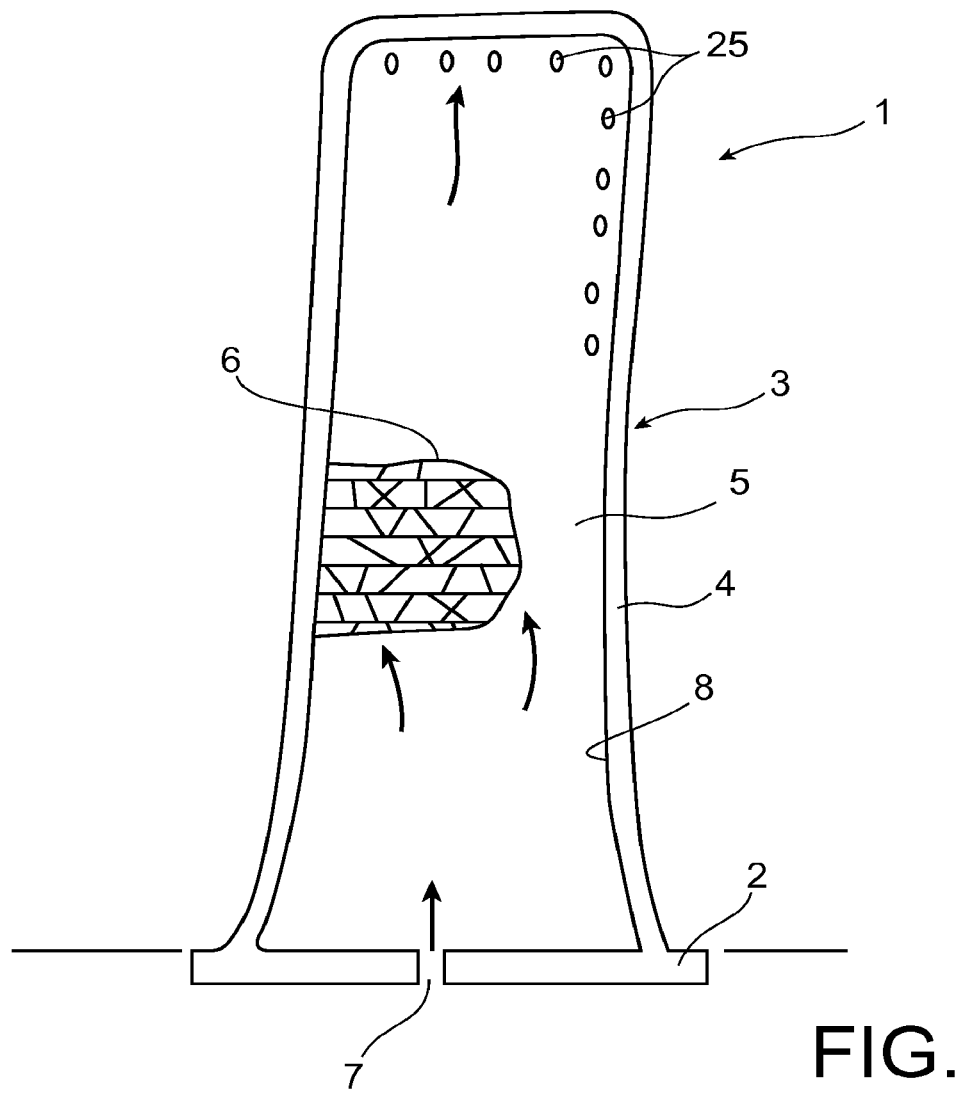
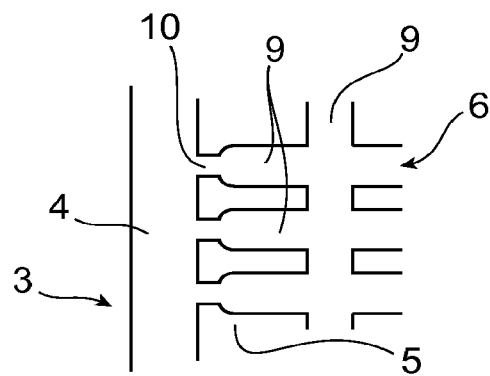
FIG. 2
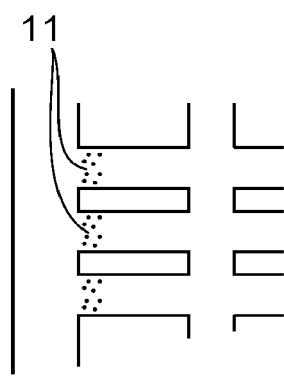
FIG. 3

HOLLOW BLADE CONTAINING AN INTERNAL LATTICE

BACKGROUND OF THE INVENTION

Field of the Invention

The present invention relates to a hollow blade comprising an internal lattice.

Description of the Related Art

Some examples of internal lattices of blades are described in the European patent documents EP 2 843 192 A1 and 3 015 647 A1. They consist of entwined three-dimensional link structures that occupy the cavity of the blade, the edges whereof join with the internal face of the external skin of the blade, but which nevertheless leave a large void volume in the cavity between the links. The dimensions of the links and the arrangements thereof can be of very different kinds. One reason for the use of such lattices is that they provide support to the external skin of the blade when it is manufactured by additive manufacturing, since the material overlying the cavity could not be deposited without such a support. However, in many cases, the lattices are also designed to allow for the ventilation and cooling of the blade by a cool air flow, which thus passes through the lattice from an inlet hollowed out of the root or the head of the blade and which can be discharged through ports passing through the external skin. The lattices thus facilitate the removal of heat from the external skin of the blade by conduction and convection, while also being responsible for a pressure drop in the ventilation air, which also affects the ventilating properties.

Other related prior art documents include the German patent document DE 102017208631 A1 (lattice composed of two structures, comprising for example cells wherein vibration-damping free bodies move), the U.S. patent document U.S. Pat. No. 7,101,154 B2 (lattice comprising heterogeneous areas, with warp yarn orientation irregularities), and the international patent document WO 2014/151066 A1 (lattice composed of superimposed two-dimensional layers of fibres with different spacings between one another and of different diameters, the fibres having orientations that cross one another from one layer to another).

The lattice links are typically extremely fine and can easily rupture due to thermal expansions or mechanical deformations of the blade when in operation. Ruptures are accompanied by a partial and random destruction of the lattice structure, thus unpredictably altering the properties thereof regarding heat removal and the internal ventilating air flow, and dispersing pollution within the air stream.

BRIEF SUMMARY OF THE INVENTION

The invention is designed to overcome this risk and to control possible structural alterations to the lattice during the life of the blade. In general terms, the invention relates to a hollow blade comprising an external skin, a cavity surrounded by the skin and a lattice structure composed of three-dimensional links entwined to form a continuous network inside the cavity, characterised in that the lattice has at least one section where all the links are manufactured with a rupture initiating point capable of rupturing when the blade is in operation on a turbine engine, and the section extends either to a lattice connection surface connecting with the external skin or through the lattice to two opposing portions of the external skin.

This section or these sections have the property of being breakable, i.e. they have a weaker structure or are made of a weaker material, which generates rupture initiating points that allow, when the circumstances require it (under certain operating conditions of the blade on a turbine engine), local or overall uncoupling of the lattice from the external skin, or of successive portions of the lattice from one another. Ruptures will thus occur only at the points where they are expected, which are generally small in volume compared to the overall volume of the lattice. Thus, transfer of stresses from outside the blade into the lattice will be prevented, and the structure thereof will be kept intact overall, thus without significantly altering the properties thereof regarding a pressure drop or the heat transfer therethrough, and without generating pollution.

These links with a lower mechanical strength or rupture initiating point can be characterised in different ways: by a structure, for example a cross-section that is weaker than the rest of the links, or by a weaker material, for example as described hereinbelow.

The sections occupied by the links having a lower mechanical strength will be placed either at the periphery of the lattice, at the connection thereof with the internal face of the external skin, or through the lattice as far as opposing portions of this internal face. In the first case, the lattice can be detached from the external skin and become free; in the second case, it can be divided into separate portions; and in both of these designs, the detachment or division can be partial or full, depending on whether or not the section will extend over the entire connection with the external skin or all the way around the blade.

The documents cited do not disclose links provided with rupture initiating points, i.e. that are weakened in relation to the rest of the lattice or even in relation to the rest of a fibre, but at most fibres having different strengths, but which are uniform over the length thereof. Ruptures in such lattices will thus occur in unpredictable patterns, risking more significant alterations to the properties thereof regarding heat removal or resistance to the internal flow of cooling air, or the complete detachment of portions of the lattice which could thus pollute the rest of the machine.

The lattices envisaged for the invention can also be very varied in terms of the arrangements, dimensions and spacings of the links, for example. They can be homogeneous, or conversely have different properties in different regions of the cavity. The links can be made up of girders or plane surfaces for which a constant or variable thickness has been defined. They are typically manufactured using a material-adding process. Some of the embodiments of the invention will thus be easy to produce by adapting a conventional process in which manufacturing is carried out by the successive deposition of layers of powder alternating with the melting and solidification of these layers to make them integral with the material of the preceding layers extending thereunder. The links having a lower mechanical strength can thus be obtained by local, incomplete melting and solidification operations, resulting in links having a weaker cross-section or a porous structure, for example.

BRIEF DESCRIPTION OF THE SEVERAL VIEWS OF THE DRA WINGS

Figure 5:
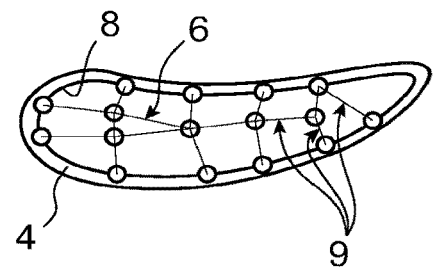
Figure 6:
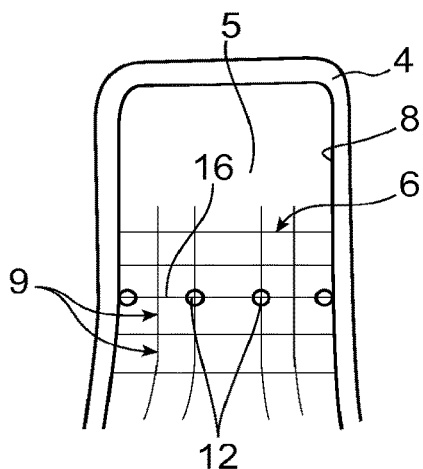
Figure 7:
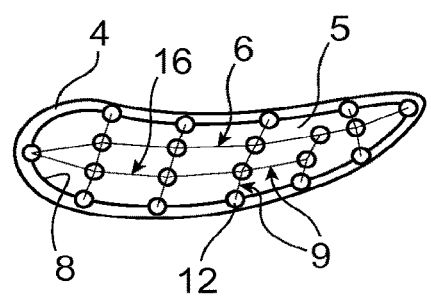
Figure 8:
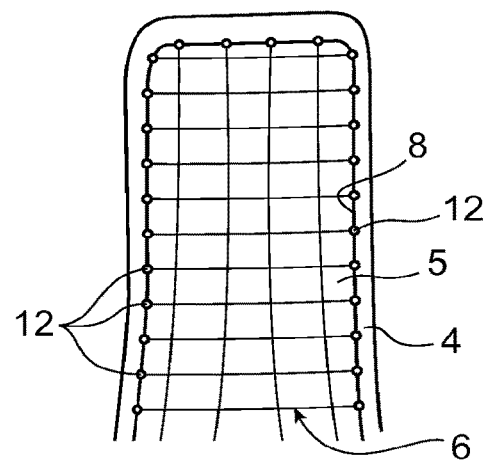
Figure 9:
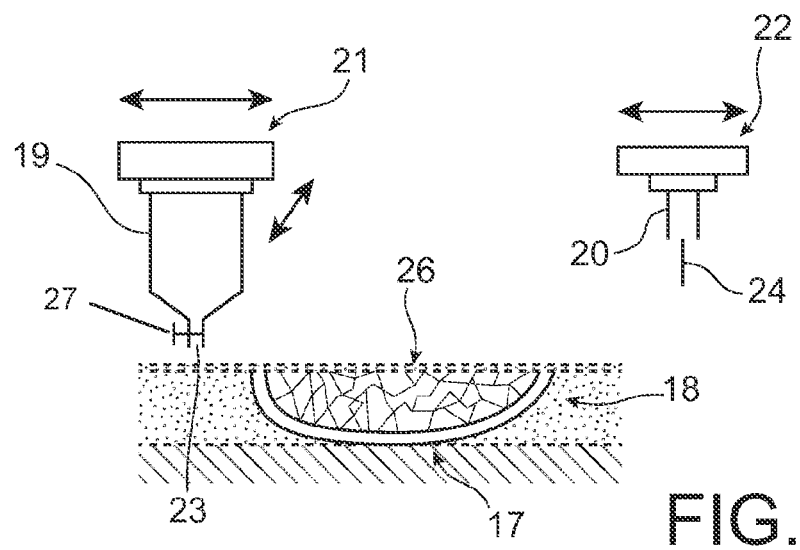
Figure 10:
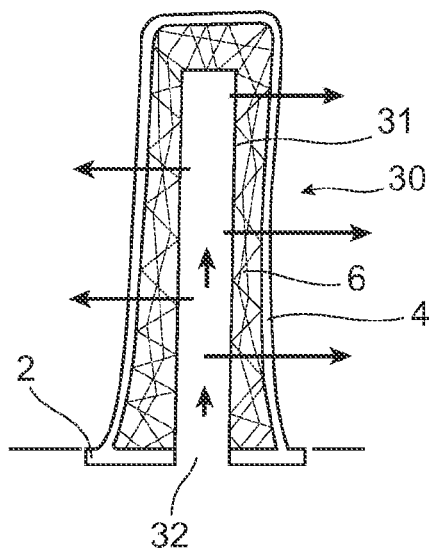
Figure 11:
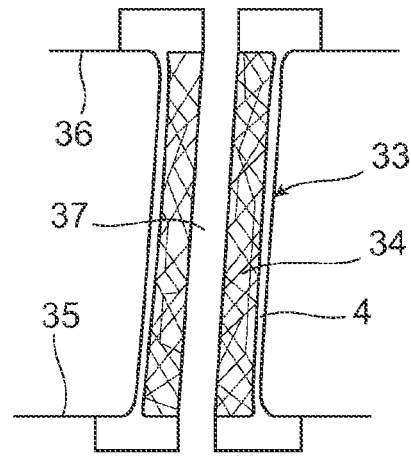
Figure 12:
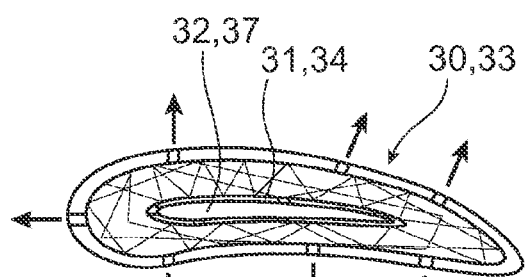

The various characteristic aspects and advantages of the invention will now be described with reference to the following figures, which show certain embodiments, intended for illustration purposes only:

FIG. 1 shows a hollow stator blade with an internal lattice;
FIG. 2: a diagram of a breakable area;
FIG. 3: another diagram of a breakable area;
FIG. 4: a description of a breakable area with a longitudinal, sectional view of the shaft;
FIG. 5: a description of a breakable area with a cross-sectional view of the shaft;

FIG. 6: a description of another breakable area with a longitudinal, sectional view of the shaft;

FIG. 7: a description of this other breakable area with a cross-sectional view of the shaft;

FIG. 8: a diagram of a free lattice inside the cavity;

FIG. 9: the illustration of a manufacturing method;

FIG. 10: another embodiment of the shaft;

FIG. 11: another embodiment of the shaft;

FIG. 12: a cross-section of either of these two embodiments.

DETAILED DESCRIPTION OF THE INVENTION

Reference is now made to FIG. 1. A hollow blade 1 comprises a root 2 and an aerodynamic blade 3 comprising an external skin 4 and an internal cavity 5. The invention could be applied, in any case, to any hollow blade. The cavity 5 fully encased by the external skin 4 contains a lattice 6 consisting of three-dimensional links 9 entwined to form a continuous network. The arrangement of the links 9, and the density, shape and direction thereof are not critical to the invention. Cool ventilation air from a supply that is not shown passes through a duct 7 through the root 2 and then through the cavity 5 as far as discharge ports 25 which can be made through the external skin 4, in the tip region of the blade 3 or near the trailing edge thereof. The lattice 6 occupies the entire volume of the cavity 5 or part thereof if an insert is integrated in the centre of the cavity, for example, and the ends of the links 9 thereof connect to the internal face 8 of the external skin 4. One embodiment of a blade having an insert is shown in FIG. 10, another in FIG. 11, and a cross-section of either thereof is shown in FIG. 12. The blade 30 in FIG. 10 comprises an insert 31 in the centre, which surrounds a free central cavity 32, and this central cavity 32, which is cylindrical in shape, is used to feed cooling air via the root 2. The lattice 6 extends between the insert 31 and the external skin 4, through which the ventilation air disperses after leaving the central cavity 32; the insert 31 and the external skin 4 are pierced to allow air to exit the shaft 30 according to this arrangement.

FIG. 11 shows a similar blade 33 except that the insert, now given the reference numeral 34, passes therethrough from end to end between the root and the head of the blade 33, which connect to respective concentric ferrules 35 and 36 of the stator of the turbine engine. The ventilation air can flow inside the central cavity 37 surrounded by the insert 34 in either direction, while dispersing inside the lattice 6 in the same way as that shown in FIG. 10. FIG. 12 is a cross-section of the blade 30 or 33.

FIGS. 2 and 3 are a partial enlargement of that shown in FIG. 1 in two different embodiments of the invention and show a fragment of the external skin 4 and the adjacent links 9. They show that certain portions thereof have the property of being breakable, and more specifically of rupturing under certain operating conditions, in particular under extreme or accidental operating conditions, when the blade 1 has been subjected to sufficient stresses which can in particular result from thermal expansions, centrifugal forces, bending forces, or vibrations, etc. when in operation. The breakable parts can comprise parts with a reduced section 10, parts with an altered, porous or discontinuous structure 11, or parts where, in more general terms, the material has lower mechanical strength properties than those of the material used elsewhere in the lattice, and thus a physically or chemically different material, etc.; any means capable of locally weakening the mechanical strength of the links 9 by creating a heterogeneity in the structure or the material thereof can be envisaged.

Reference is now made to FIGS. 4, 5, 6 and 7. The breakable parts, now given the reference numeral 12, can in theory be placed anywhere on the lattice 6. However in practice, they should be placed where they are likely to be of benefit. Such locations can be regions where the links 9 connect with the external skin 4, as shown in FIGS. 2 and 3. However, in more general terms, the breakable parts 12 will be located on certain sections of the lattice 6, in order to favour a clean and ordered division of the lattice 6 capable of safely reducing internal stresses, and all of the links 9 present in this section will thus bear a breakable part 12.

FIGS. 4 and 5 show an important configuration, wherein the section 13 bearing the breakable parts 12 corresponds to a connection of the lattice 6 with the internal face 8 of the external skin 4, optionally over the entire connecting surface area, or, as shown, over a strip of this surface area, for example between two parallel sides 14 and 15, which are in this case horizontal, and which may or may not extend all the way around the blade 3. Again, no mandatory configuration exists in this case, and the section bearing the breakable parts 12 could extend, for example, over a part of a circumference, an oblique strip, a vertical strip, or another shape. FIGS. 6 and 7 show another important configuration, wherein the section 16 bearing the breakable parts 12 is a slice through the cavity 5, the breakable parts 12 thus also being located inside the cavity 5, away from the external skin 4. The section 16 can be horizontal as shown, or again, it can be vertical, oblique or of any shape, curvature or orientation. In this configuration, the section 16 will often extend between two opposing portions of the internal face 8, thus across a full dimension of the cavity 5, without this being mandatory. The section 16 is thus able, without this being mandatory, to extend all the way around the internal face 8, thus completely dividing the lattice 6 into two portions, or not. In these various exceptions, the breakable parts 12 could be located on the free lengths of the links 9 or at the intersections thereof, at nodes of the lattice 6.

If the breakable parts 12 rupture, the lattice 6 is released at this point, i.e. it is separated from the external skin 4 in the case of the section 13, or, in a situation such as that shown in FIGS. 6 and 7, it is divided into separate parts on either side of the section 16.

FIG. 8 shows a typical situation, where the breakable parts 12 extend over the entire connecting surface area connecting the lattice 6 with the internal face 8, and this is thus completely free inside the cavity 5 when the breakable parts 12 have given way.

This separation or this division of the lattice 6 allows the stresses thereon during operation of the machine to be reduced and prevents any risk of the links 9 that are stronger outside the breakable parts 12, from rupturing elsewhere. The structure thereof is thus kept whole throughout almost the entire volume of the cavity 5, thus almost perfectly maintaining the initial properties regarding a pressure drop in the ventilation flow and heat removal, at least by convection, even if conduction from the external skin 4 is reduced, especially in a situation such as that shown in FIG. 8.

The blades 1 having an internal structure with a lattice 6 are generally built using a material-adding technique, which can be combined with a sintering method. FIG. 9 explains a method that is characteristic of the invention. The device comprises a bed 17 on which a blank 18 of the blade 1 being manufactured is placed; a powder supply tank 19 and a laser 20 move over the bed 17, mounted on X-Y tables 21 and 22, the blank 18 thus allowing them to be placed over any point.

The powder can fall from the bottom of the tank 19 through a nozzle 23 onto all points of the bed 17, and the laser 20 emits a beam 24 also directed towards this bed 17. The blade 3 will be manufactured by successively depositing layers 26 of powder on the already-deposited material of the blank 18. After each layer 26, the laser 20 is brought to the locations intended to produce the solid part of the blade 1, i.e. above the external skin 4 and the lattice 6, to locally melt the powder at these locations and then let it solidify. The melted portions of the layer 26 are aggregated to the rest of the blank 18, which is thus built up in successive elevations; the part remaining free at the cavity 5 is removed at the end of the method by means of draining ports.

The thickness of the layer 26 is imposed by a scraper 27 which accompanies the nozzle 23 and can be raised after each layer deposition; moreover, the nozzle 23 can be linear in a horizontal direction Y, the table 22 thus only being capable of moving in the other horizontal direction X. These alternative embodiments of the method are insignificant to the invention.

According to the invention, the laser 20 carries out incomplete melting or no melting at the points corresponding to the breakable parts 12. The corresponding material will thus be partially aggregated with the rest of the structure and the structure thereof can be porous or discontinuous. This can be achieved simply by supplying less energy through the beam 24.

The invention claimed is:

1. A hollow blade comprising:
an external skin,
a cavity surrounded by the external skin, and
a structure in a form of a lattice composed of links entwined to form a continuous three-dimensional network inside the cavity,
wherein the hollow blade comprises only one lattice structure that is monolithic and unitary,
wherein the lattice has at least one section where all the links comprise a rupture initiating point capable of rupturing when the hollow blade is in operation in a turbine engine, and the at least one section extends either at a lattice connection surface connecting with the external skin or through the lattice to two opposing portions of the external skin,
wherein said links located at said at least one section have a lower mechanical strength than the links located outside said at least one section, and
wherein all of the rupture initiating points are provided on a section or provided inside a band bounded by two parallel planes.

2. The hollow blade according to claim 1, wherein said links located at said at least one section have a weaker structure than the links located outside said at least one section.

3. The hollow blade according to claim 1, wherein said links located at said at least one section are made of a weaker material than the links located outside said at least one section.

4. The hollow blade according to claim 1, wherein the at least one section extends over all of the lattice connection surface connecting the lattice with the external skin.

5. The hollow blade according to claim 1, wherein said hollow blade is manufactured by additive manufacturing.

6. A hollow blade comprising:
an external skin,
a cavity surrounded by the external skin, and
a structure in a form of a lattice composed of links entwined to form a continuous three-dimensional network inside the cavity,
wherein the hollow blade comprises only one lattice structure that is monolithic and unitary,
wherein the lattice comprises weaker links having a lower mechanical strength than complementary links of the lattice, said weaker links being capable of rupturing when the hollow blade is in operation in a turbine engine,
wherein the weaker links are arranged in at least one section, said at least one section being a section connecting the lattice to the external skin, and
wherein all of the weaker links are provided on a section or provided inside a band bounded by two parallel planes.

7. The hollow blade according to claim 6, wherein said links located at said at least one section have a weaker structure than the complementary links located outside said at least one section.

8. The hollow blade according to claim 6, wherein said links located at said at least one section are made of a weaker material than the complementary links located outside said at least one section.

9. The hollow blade according to claim 6, wherein the at least one section extends over an entire connection surface connecting the lattice with the external skin.

10. The hollow blade according to claim 6, wherein said hollow blade is manufactured by additive manufacturing.

11. A hollow blade comprising:
an external skin,
a cavity surrounded by the external skin, and
a structure in a form of a lattice composed of links entwined to form a continuous three-dimensional network inside the cavity,
wherein the hollow blade comprises only one lattice structure that is monolithic and unitary,
wherein the lattice comprises weaker links having a lower mechanical strength than complementary links of the lattice, said weaker links being capable of rupturing when the hollow blade is in operation in a turbine engine,
wherein the weaker links are arranged in at least one section, said at least one section separating two parts of the lattice and being limited by opposing portions of the external skin, and
wherein all of the weaker links are provided on a section or provided inside a band bounded by two parallel planes.

12. The hollow blade according to claim 11, wherein said links located at said at least one section have a weaker structure than the complementary links located outside said at least one section.

13. The hollow blade according to claim 11, wherein said links located at said at least one section are made of a weaker material than the complementary links located outside said at least one section.

14. The hollow blade according to claim 11, wherein said hollow blade is manufactured by additive manufacturing.

* * * * *